United States Patent
Rodriguez et al.

(10) Patent No.: US 12,555,370 B2
(45) Date of Patent: Feb. 17, 2026

(54) RANGE ESTIMATION IN AUTONOMOUS MARITIME VEHICLES

(71) Applicant: SeaSatellites, Inc., San Diego, CA (US)

(72) Inventors: Dylan Rodriguez, San Diego, CA (US); Michael Flanigan, San Diego, CA (US)

(73) Assignee: SeaSatellites, Inc., San Diego, CA (US)

( * ) Notice: Subject to any disclaimer, the term of this patent is extended or adjusted under 35 U.S.C. 154(b) by 198 days.

(21) Appl. No.: 18/433,844

(22) Filed: Feb. 6, 2024

(65) Prior Publication Data

US 2025/0251731 A1 Aug. 7, 2025

(51) Int. Cl.
| | |
|---|---|
| *G06V 10/82* | (2022.01) |
| *G06V 20/56* | (2022.01) |
| *G05D 1/617* | (2024.01) |
| *G05D 109/30* | (2024.01) |
| *G05D 111/10* | (2024.01) |

(52) U.S. Cl.
CPC ............ *G06V 10/82* (2022.01); *G06V 20/56* (2022.01); *G05D 1/617* (2024.01); *G05D 2109/34* (2024.01); *G05D 2111/10* (2024.01)

(58) Field of Classification Search
None
See application file for complete search history.

(56) References Cited

U.S. PATENT DOCUMENTS

| | | | |
|---|---|---|---|
| 11,702,175 | B2 | 7/2023 | Park et al. |
| 2020/0050202 | A1 | 2/2020 | Suresh et al. |
| 2020/0050893 | A1 | 2/2020 | Suresh et al. |
| 2021/0357655 | A1 | 11/2021 | Park et al. |
| 2021/0374461 | A1 | 12/2021 | Park et al. |
| 2022/0004761 | A1 | 1/2022 | Biancale |
| 2022/0081113 | A1 | 3/2022 | Twining |
| 2022/0351523 | A1 | 11/2022 | Kim et al. |
| 2023/0068036 | A1* | 3/2023 | Park ........................ G06F 18/21 |
| 2023/0073225 | A1 | 3/2023 | Chan et al. |

FOREIGN PATENT DOCUMENTS

JP    2025101123 A   *   7/2025

* cited by examiner

*Primary Examiner* — Peter D Nolan
*Assistant Examiner* — Michael F Whalen
(74) *Attorney, Agent, or Firm* — Scale LLP

(57) ABSTRACT

Embodiments of the invention include systems and methods for range estimation in autonomous maritime vehicles through use of an image processing model. The model comprises a neural network that informs the vehicle as to the ranges of real-world objects based on a diversified set of synthetic and real-world training data. During training, the model estimates the ranges of objects and/or subcomponents extracted from the training data and compares the estimated ranges with the corresponding ground truths. The system then uses the results of the comparisons to update the weights and biases in the neural network and improve the accuracy and performance of the image processing model deployed to the vehicle.

20 Claims, 6 Drawing Sheets

RANGE ESTIMATION IN AUTONOMOUS MARITIME VEHICLES

TECHNICAL FIELD

Various aspects of the present disclosure relate generally to systems and methods for range estimation in maritime environments and, more particularly, to systems and methods for estimating the range of objects from autonomous maritime vehicles.

BACKGROUND

Autonomous vehicles are becoming increasingly prevalent in land, sea, air, and space domains. Fundamentally, all autonomous vehicles face certain challenges, one of which is to identify objects in the surrounding environment and determine the distance between the vehicle and the object, otherwise known as the "range" of the object. Identifying the range of objects is especially important for obstacle avoidance. This is a challenging problem to solve because of variabilities in, for example, the endless types of objects (e.g., each with different sizes, shapes, behaviors, etc.) and environmental conditions (e.g., different amounts of daylight and types of weather). In maritime environments (e.g., the open ocean), there can be even greater difficulty due to a lack of consistent reference points such as the street signs and traffic lights that an autonomous automobile might encounter on a city street.

In many cases, if an autonomous maritime vehicle needs to determine an unknown distance of a detected object within its purview, it must execute a comprehensive machine learning pipeline to identify the object before performing any range estimation on the object. There presently exists both a long latency in training such a machine learning model, and a long latency (i.e., computation time) when deploying such a model in the field. Accordingly, autonomous systems for performing range estimation on maritime objects in real-time are often costly and unreliable. There is a need for improved systems that can autonomously perform range estimation in a maritime environment in a manner consistent with real-time expectations.

The present disclosure is directed to overcoming one or more of these above-referenced challenges.

SUMMARY OF THE DISCLOSURE

According to certain aspects of the disclosure, systems, methods, and computer readable memory are disclosed for range estimation in maritime environments and, more particularly, to systems and methods for range estimation in autonomous maritime vehicles.

Embodiments of the invention include a system comprising a vehicle (e.g., an autonomous maritime vehicle). The vehicle comprises a processing unit and one or more sensors (e.g., cameras). The sensors capture images of the surrounding maritime environment to aid in the vehicle's navigation or other mission-driven applications. The images comprise at least one maritime object and a set of sub-components associated with the at least one maritime object. Using an image processing model, the system processes the sensor data. The image processing model comprises a neural network that is trained on synthetic and real-world sample images provided by a simulation engine and an identification system respectively. Using the image processing model, the system extracts at least one sub-component from the set of sub-components associated with the object and then, using the image processing model, generates a range estimate of the vehicle from the real-world object based on the extracted at least one sub-component.

In embodiments of the invention, the identification system comprises an observation device, and the plurality of real-world images are captured by the observation device. The observation device can be embodied, for example, in a buoy. In the same or alternative embodiments, the identification system communicates the real-world images and location information to a database, wherein each of the real-world images comprises at least one real-world object, and wherein the location information includes the location of the real-world object and the location of the observation device. The one or more real-world images can be labeled with known range data, wherein the known range data can be based on a distance between the location of the observation device and the location of the real-world object.

In embodiments, the system is further configured to estimate, using the image processing model, the range between the observation device and the real-world object; compare, using the image processing model, the estimated range with the known range data; and update, using the image processing model, the neural network based on the comparison. In embodiments, the estimated range is based on information learned by the image processing model about one or more sub-components of the real-world object.

In embodiments, the simulation engine generates the plurality of synthetic images by executing simulations in one or more virtual maritime environments, wherein each virtual maritime environment comprises at least one virtual object and one or more sub-components associated with the at least one virtual object. The simulations comprise a virtual camera with a known location within the virtual maritime environment, and the virtual camera is configured to capture an image of the at least one virtual object having a known location within the virtual maritime environment. In embodiments, one or more of the synthetic images are labeled with known range data, wherein the known range data is based on a distance between the location of the virtual camera and the location of the virtual object. The system is further configured to estimate, using the image processing model, the range between the virtual camera and the virtual object; compare, using the image processing model, the estimated range with the known range data; and update, using the image processing model, the neural network based on the comparison.

Embodiments of the invention also include one or more methods for implementing the system described above. Additional objects and advantages of the disclosed technology are set forth below, and will be directly apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

DETAILED DESCRIPTION

Various aspects of the present disclosure relate generally to range estimation in maritime environments and, more particularly, to systems and methods for range estimation in autonomous maritime vehicles.

Embodiments of the present invention include a novel system comprising an autonomous maritime vehicle that uses an image processing model to identify a variety of objects, including a set of sub-components of those objects, within a maritime environment. The image processing model comprises a neural network that informs the vehicle as to the range(s) of the objects based on a diversified set of training data. In embodiments, the training data comprises synthetic images generated by a simulation engine and real-world images captured by an identification system within a maritime environment. The training data can, for example, be labeled with range information, location data, dimension values, and other characteristics or parameters of the objects, sub-components, simulations, and identification system. In embodiments, the system estimates, using the image processing model, the ranges of objects in the training data and compares the estimated ranges with the respective ground truths (i.e., the known ranges from the synthetic and real-world images). The system then uses the results of the comparisons to update the weights and biases in the neural network and improve the accuracy and performance of the image processing model.

Figure 1A:
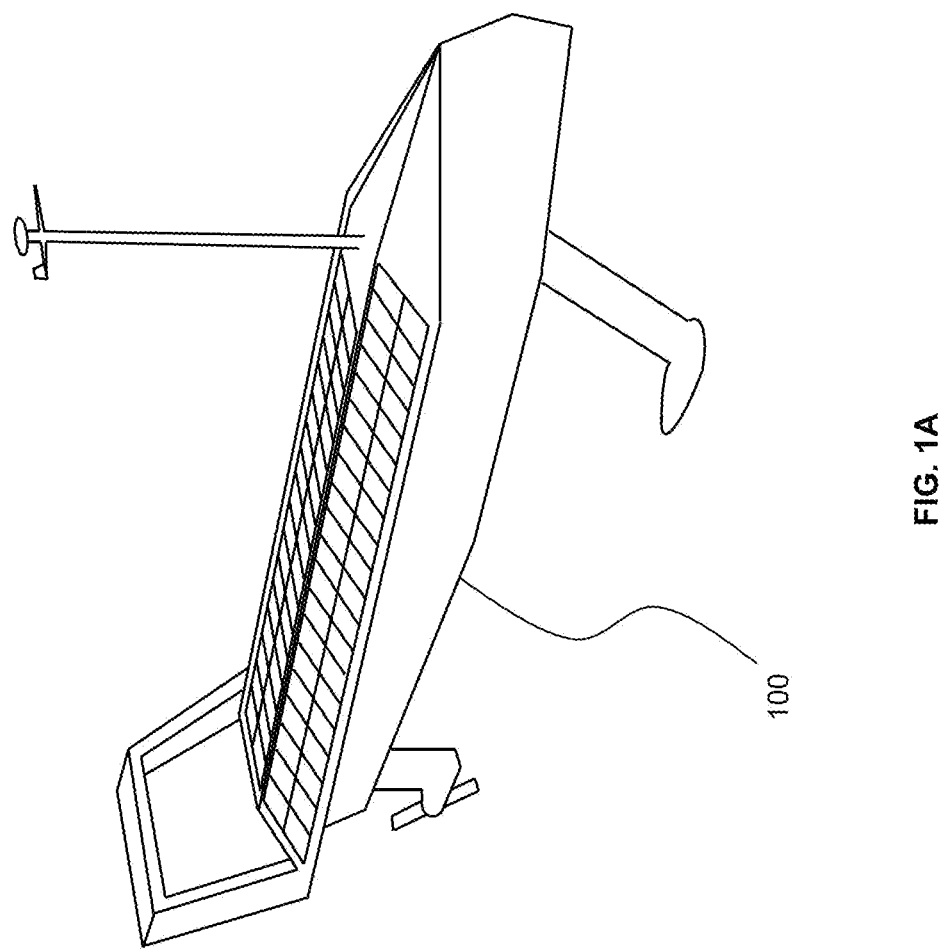
FIGS. 1A-1B show an exemplary environment of a system configured to estimate a range of an object from an autonomous maritime vehicle.
Figure 1B:
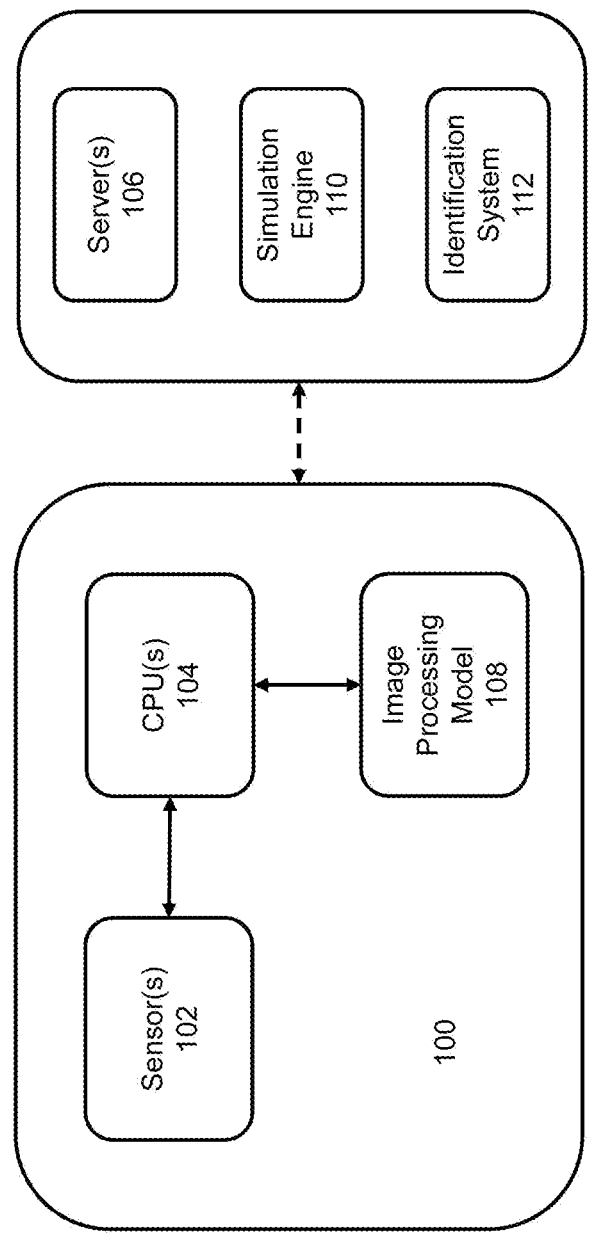

FIG. 1A illustrates a vehicle 100, e.g., an autonomous maritime vehicle, configured to embody one or more aspects of the present invention. FIG. 1B illustrates an exemplary environment of a system configured to estimate a range of an object from the vehicle 100. The system includes a vehicle 100, which comprises one or more sensors 102, one or more central processing units (CPUs) 104, and an image processing model 108. Vehicle 100 can communicate (e.g., wirelessly) with one or more server(s) 106, a simulation engine 110, and an identification system 112.

In embodiments, the vehicle 100 is an autonomous maritime vehicle such as a boat. In alternative embodiments, the vehicle 100 can be a ship (e.g., a commercial ship), drone (e.g., a surveillance drone), aircraft, vessel, or any other maritime vehicle. The vehicle 100 can have a forward or bow side, a right or starboard side, a left or port side, and a rear or stern side. The forward side can be defined as the forward, or main, direction of travel of the vehicle 100. The right side can be defined from the point of view of the vehicle 100, or as 90 degrees clockwise from the forward direction when viewed from above. The vehicle 100, can be an autonomous, semi-autonomous, self-driving, or driverless vehicle, which means it is capable of sensing its environment and moving with little or no human input. The vehicle 100 can employ a variety of sensors 102, some of which are described below, to perceive its surroundings, whereby advanced control systems interpret sensory information to identify appropriate navigation paths, as well as obstacles and terrain. As described further below, by having a feature that allows for the vehicle 100 to determine ranges of other maritime objects, the vehicle 100 can autonomously navigate the waters while avoiding collisions. In addition to navigation, determining the ranges of maritime objects in real-time has other mission-driven applications (e.g., research, search and rescue, and reconnaissance).

The sensor(s) 102 can be components of a machine vision system and can include one or more cameras and/or lasers coupled to the system. In embodiments, the cameras capture image data and the lasers capture supplemental data to be combined with the image data. In the same or alternative embodiments, the sensor(s) 102 can include other technologies like radar, sonar, and/or the like for capturing supplemental data. The sensor(s) 102 can be disposed on the vehicle 100 described above and configured to capture images whose pixels are fed through the deployed image processing model 108.

The one or more CPUs 104 can execute instructions corresponding to an operating system (O/S) and the image processing model 108. The O/S can, for example, execute one or more programs or applications onboard vehicle 100, including programs to support autonomous or semi-autonomous navigation. The CPU(s) 104 can also include a communication module to send and receive communications to one or more of the server(s) 106, the sensor(s) 102, and/or other devices. In embodiments, the CPU(s) 104 are embodied on the vehicle 100. In other embodiments, at least some CPU function is embodied off the vehicle 100 (e.g., cloud-based or within the server(s) 106).

The server(s) 106 can coordinate data and/or instructions between various components of the environment, such as the identification system 112, the simulation engine 110, the CPU(s) 104, and the image processing model 108. The image processing model 108 can reside onboard the vehicle 100, within the server(s) 106, or within another computing device on or off the vehicle 100. The server(s) 106 can also host a data structure responsible for storing training data or other data associated with the image processing model 108.

In embodiments of the invention, the image processing model 108 comprises a neural network that is trained to estimate the ranges of objects in the field of view of an autonomous maritime vehicle. The training phase can occur entirely before the image processing model 108 is deployed in the field and/or continuously or intermittently after the image processing model 108 is deployed in the field. In embodiments, the image processing model 108 receives training data, estimates the range(s) of one or more objects in the training data, and then compares the estimates with the respective ground truths of the training data. The image processing model 108 then uses the comparisons to validate the estimates and update the weights and biases of the neural network accordingly.

Figure 3:
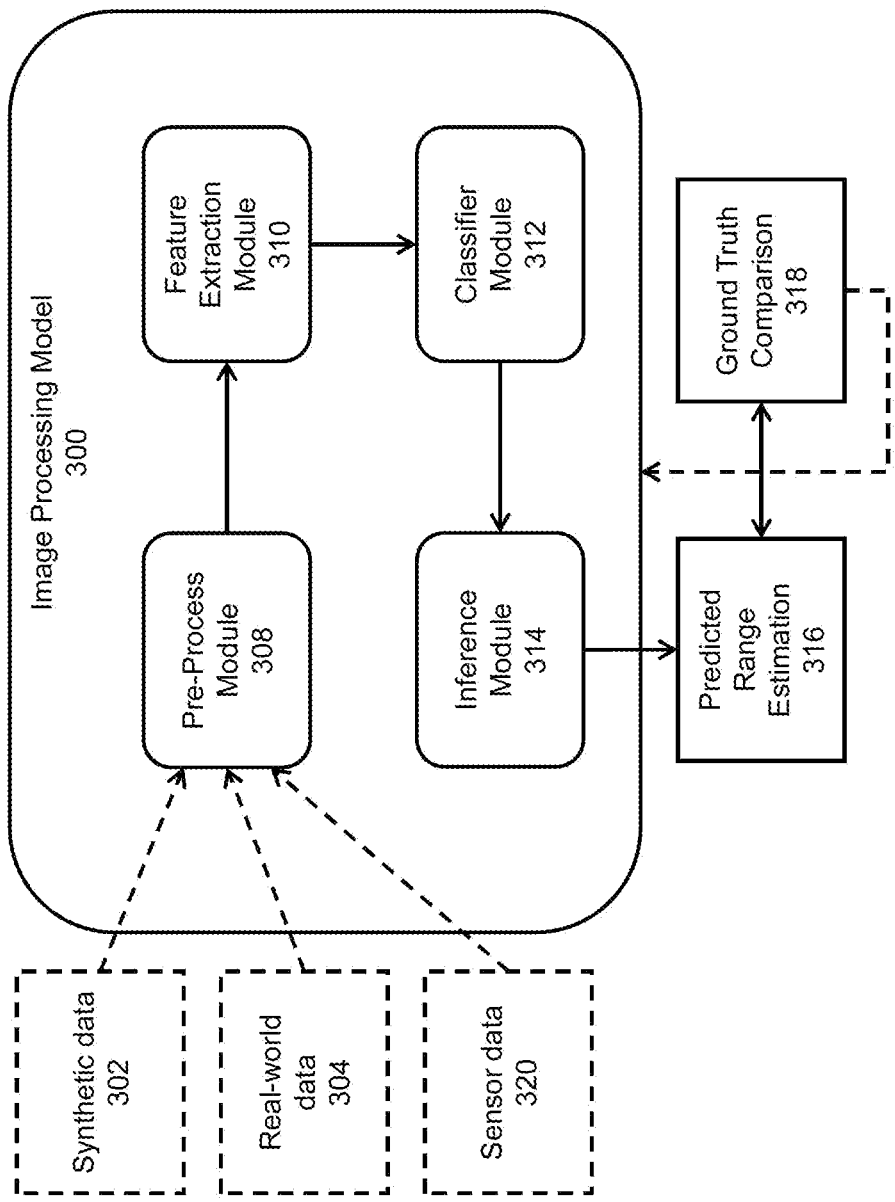
FIG. 3 shows an exemplary overview of an image processing model.

As described further with respect to FIG. 3, the training process can involve a combination of sample image inputs generated from both synthetic data (e.g., generated at the simulation engine 110) and real-world training data (e.g., generated at the identification system 112). In embodiments, a prohibitively large number of sample images may be needed to train the image processing model 108. Using synthetic data speeds the process of acquiring a requisite number of images, while using real-world training data ensures that the image processing model learns from real-world situations the vehicle 100 is more likely to encounter in the field. Accordingly, combining the two sample image input sources improves both the speed at which the image processing model 108 is trained and the diversity and relevance of the training data set.

In embodiments of the invention, a simulation engine 110 generates the synthetic training data described above. The simulation engine 110 can be or can include features and/or techniques commonly used in video game engines (e.g., the UNREAL ENGINE by EPIC GAMES). For example, the simulation engine 110 can create data that represents a realistic image of a maritime environment. The simulation engine 110 can generate synthetic images by executing a series of simulations. As described further with respect to FIG. 3, the synthetic data generated at the simulation engine 110 can be diversified (e.g., each synthetic image depicts a unique configuration of maritime virtual objects with different characteristics such as sizes, type, etc.) in order to generate a training set of sample images with diverse characteristics. In embodiments, the simulations apply codified physics to simulate real-world conditions and behaviors of virtual objects and the surrounding environment.

In embodiments, the synthetic data 302 can be generated and obtained from executing simulations across a diverse set of virtual environments, where each virtual environment depicts a virtual maritime environment along with a unique configuration set of virtual objects and virtual sub-components. The types of objects and sub-components can be diversified (e.g., by choosing different sets of ship types) in the simulations and resulting sample images. For example, it may be advantageous for the neural network of the image processing model 300 to learn 1,000 or more classes of ship types. Each sample image can be accompanied by one or more sets of characteristics of the objects and corresponding sub-components. In embodiments, the characteristics can include dimension values (e.g., height, width, length, and/or depth of the virtual objects and sub-components) and/or classification information (e.g., based on a taxonomic system of categories, types, and/or names of the virtual objects and sub-components). The characteristics enable the image processing model 300 to learn, for example, that a particular type of ship has a length of 30 meters.

In embodiments, the distance of the virtual objects from the source (i.e., the simulated camera source) can be diversified and/or the sensor parameters (e.g., camera optics such as focal length, image resolution, lens distortion, and/or the like) can be varied for each simulation. In some embodiments, other parameters are diversified, including atmospheric and weather conditions, amounts of daylight or moonlight, sea conditions, etc. Each of the foregoing can be manually or programmatically altered so that the image processing model 300 is exposed to a wide range of conditions. By diversifying the sample images during the training phase, the deployed image processing model 300 will be more robust and better able to estimate ranges for a wide variety of object types and conditions.

In embodiments, another source of sample image data comes from real-world training data. The identification system 112 captures real-world training data directly from a maritime environment. The identification system 112 can be a land, sea, and/or air-based system that is capable of capturing images of a maritime environment and corresponding location information that can be used to train the image processing model 108. The identification system 112 can also capture and/or record other supplemental data (e.g., current atmospheric conditions), dimension values, and/or object/sub-component classification information, all of which when combined with image and location data make up the real-world training data.

Embodiments of the identification system 112 comprise one or more observation devices (e.g., observation device 202 in FIG. 2), a data structure for storing captured training data (e.g., data structure 200 in FIG. 2), and one or more communication devices for receiving and transmitting training data. Embodiments of identification system 112 comprise an automatic identification system or AIS for receiving location data from AIS-equipped maritime objects.

Figure 2:
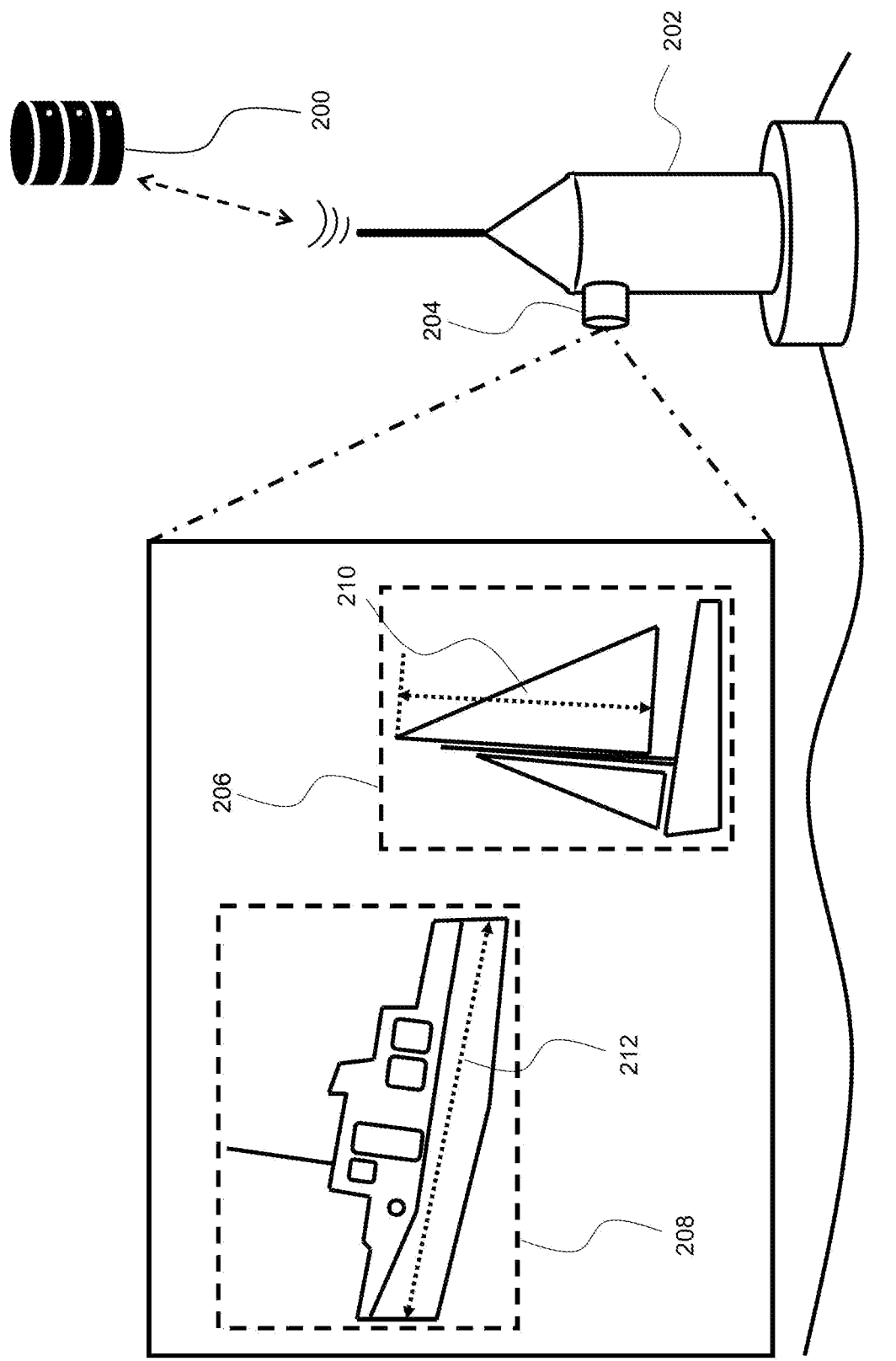
FIG. 2 shows an exemplary overview environment for identifying objects and sub-components of objects from captured images.

FIG. 2 illustrates exemplary embodiments of the invention, including the identification system 112, which comprises a data structure 200 and an observation device 202 coupled with one or more sensors 204 (e.g., cameras and/or lasers). In embodiments, the observation device can be embodied in a buoy positioned with known coordinates in a body of water. In other embodiments, the observation device 202 is positioned on land (e.g., on a dock) or is embodied on an autonomous, semi-autonomous, or human-controlled boat or aircraft which can be roaming or at rest.

In embodiments, the one or more sensors 204 are disposed on the observation device 202 and include, for example, one or more cameras, laser transmitters and receivers, radar transmitters and receivers, other object-sensing technologies, or any combination of these technologies. The one or more sensors 204 can be attached to the observation device 202 or wirelessly coupled to the observation device 202.

In embodiments of the invention, the identification system 112 can capture real-world training data by capturing sample images, via the observation device 202, of maritime objects (e.g., first object 206, second object 208, and their respective sub-components) together with available location information. The location information includes the location (e.g., GPS coordinates) of the observation device 202 and the locations of maritime objects (e.g., ships and boats) that know and can broadcast their coordinates. For example, automatic identification system (AIS) equipped ships regularly broadcast their locations over maritime VHF bands. Embodiments of the identification system 112 can include an AIS for capturing broadcasted location information. In embodiments, the broadcasted information can also include additional information including a ship ID number and/or ship type. The broadcasted location information and any additional information can then be associated (e.g., as labels) with the respective images of the maritime objects captured by the observation device 202. Embodiments of the identification system 112 can store the training data in the data structure 200. In embodiments, the data structure 200 can comprise one or more databases and can be included in the one or more servers 106 described with respect to FIG. 1.

As discussed above, sample images from synthetic or real-world training data can include one or more objects (i.e., virtual or real-world) and their respective sets of subcomponents. A sub-component can be any distinguishable feature of a maritime object, including, for example, sides, motors, masts, sails, doors, windows, hatches, antenna, and any other distinguishable feature of a maritime object. FIG. 2 illustrates a first object 206, which can contain one or more sub-components, where each sub-component can optionally have a set of characteristics. For example, a sub-component 210 can be identified as a sail of the first object 206. The sub-component's characteristics can, for example, include one or more dimension values, such as a height of "4 meters". FIG. 2 further illustrates a second object 208, which can contain one or more sub-components. For example, a sub-component 212 associated with the port-side of the object 208 can be identified.

FIG. 3 shows an exemplary overview of the image processing model 300. In embodiments, the image processing model 300 can be trained with the training data discussed above, including synthetic data 302 and real-world data 304.

The image processing model 300 can comprise a pre-process module 308, a feature extraction module 310, a classifier module 312, and/or an inference module 314. The output of the image processing model can comprise a predicted range estimation 316 which can be compared, at operation 318, to a ground truth for fine-tuning the neural network.

As discussed above, the synthetic data 302 and real-world data 304 can include one or more sample images, the location data of one or more objects (e.g., ships) depicted in the captured sample image, and labels (i.e., characteristic information) of the one or more objects and corresponding sub-components. The image processing model 300 can use the location data and/or the labels to set a ground truth of the range estimation for a given object in a sample image.

In embodiments, the synthetic data 302 and real-world data 304 can first be pre-processed by pre-process module 308. The pre-process module 308 can perform one or more of a variety of pre-processing steps to improve the model's performance and/or training speed. Exemplary pre-processing steps can include data normalization (e.g., normalizing a range of pixel values to a smaller range to help the model converge faster), size optimization (e.g., reducing the size of training images reduces the computational cost and training time), image standardization (e.g., rotating, flipping, or scaling images to a standardized format reduces training time), and edge detection (e.g., edge detection can reduce the computation effort needed to extract objects and sub-components from an image). Upon completion of one or more pre-processing steps, embodiments of the image processing model 300 can pass the training input sample images to the feature extraction module 310.

The feature extraction module 310 can receive the pre-processed data (or derivatives thereof) from the pre-process module 308 and extract one or more objects and one or more corresponding sub-components from the sample images. In embodiments, the feature extraction module 310 does not yet classify the objects or sub-components. In embodiments, the feature extraction module 310 can use one or more filters, as part of a convolution operation, to identify various features like edges, shapes, textures, and colors.

In embodiments, the classifier module 312 can receive any extracted objects and/or sub-components from the feature extraction module 310 and attempt to categorize them into different classes. For example, the classifier module 312 can identify that a first feature relates to a first sub-component, such as a bow of a boat, while a second feature relates to a second sub-component, such as a mast on a boat. In embodiments, the classifier module 312 utilizes the image tags (i.e., characteristic information) to classify the objects and sub-components.

In embodiments, the inference module 314 can receive any extracted objects and/or sub-components and estimate a corresponding range from the respective sensor or camera (real or virtual) based on information learned about the objects and/or sub-components. For example, the inference module 314 can infer that an identified sub-component is similar to a certain boat feature (e.g., sail, mast, hatch, etc.) that it has previously seen. Based on the feature's orientation, information about the real or virtual camera that captured the image (e.g., a camera's focal length), and/or a count of the pixels along one or more dimensions of the feature, the inference module 314 can estimate the range of the feature and/or the corresponding boat from the source. In other words, the inference module 314 can use information learned about objects and sub-components and how big or small they appear (e.g., in pixels) at certain ranges to estimate the ranges of new objects and sub-components.

In embodiments, the output from the image processing model 300 is a predicted range estimation 316 for an object. In some embodiments, the image processing model 300 can additionally predict one or more labels associated with the object (e.g., a classification of the type of object based on earlier steps). In embodiments, the predicted range estimation 316 is compared, at operation 318, to a ground truth range. This comparison can inform a determination as to whether the image processing model 300 is ready for real-world deployment, and it can be used to further refine the neural network. For example, if the predicted range estimation 316 is within a predefined error threshold when compared to a ground truth (i.e., a known range), then the image processing model is more likely to be ready for deployment. Alternatively, if the predicted range estimation 316 is not within the error threshold, the image processing model 300 utilizes this feedback to update the weights and biases of the neural network.

In embodiments, once the image processing model 300 is sufficiently trained, it can be deployed for use with a vehicle, e.g., autonomous maritime vehicle 100. Once deployed, embodiments of the invention provide sensor data 320 to the image processing model 300. The sensor data 320 comes from the sensor(s) 102 while vehicle 100 is navigating through its surrounding environment, and it comprises image data and optionally supplemental data as described above. The image processing model then processes the sensor data 320 in much the same way that it processes training data (i.e., synthetic data 302 and real-world data 304).

In embodiments, the sensor data 320 is first processed by the pre-process module 308 to perform one or more of a variety of pre-processing steps (e.g., data normalization, size optimization, image standardization, edge detection, etc.). Upon completion of one or more pre-processing steps, embodiments of the image processing model 300 pass the sensor data 320 to the feature extraction module 310, which extracts the objects and corresponding sub-components from the sensor data 320. Next, the inference module 314 receives the extracted objects and sub-components, determines one or more dimension values for the extracted objects and sub-components, and provides a predicted range estimation 316 for each object based on the neural network of the trained image processing model 300. In embodiments, the predicted range estimation 316 is output to the vehicle 100, which uses the information for navigation (i.e., object avoidance) and/or other mission-driven applications.

Figures 4A, 4B:
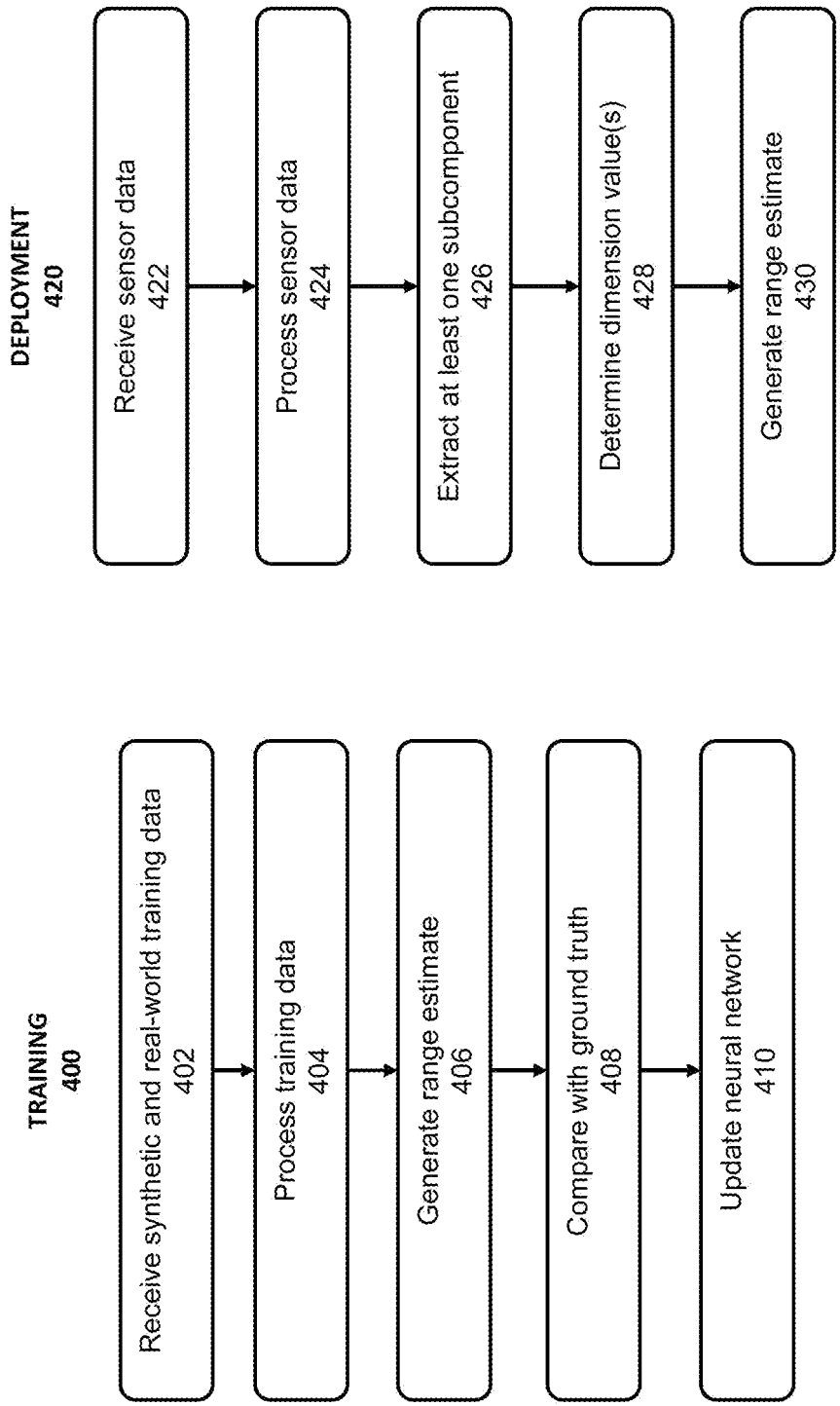
FIGS. 4A-4B depict flowcharts of exemplary routines for range estimation in an autonomous maritime vehicle.

FIG. 4A illustrates a flowchart of an exemplary routine 400 for training an image processing model (e.g., image processing model 300). In the routine 400, the method can be performed by one or more systems as described above. The routine 400 starts at step 402, where the system receives synthetic and/or real-world training data (e.g., from simulation engine 110 and identification system 112 respectively). At step 404, an image processing model (e.g., image processing model 300) processes the training data. Processing can, for example, include one or more of pre-processing, feature extraction, classification, and inference as described in more detail above. At step 406, the image processing model generates a range estimate, and then compares the range estimate to the corresponding ground truth at step 408. The image processing model then updates the weights and biases of its neural network accordingly at step 410, based on the comparison between the range estimate and the ground truth.

FIG. 4B illustrates a flowchart of an exemplary routine 420 for deploying an image processing model (e.g., image processing model 300) onboard a vehicle (e.g., vehicle 100). At step 422, the vehicle receives sensor data (e.g., from sensors 102), which includes one or more images of the surrounding environment. The images include one or more objects and corresponding subcomponents. At step 424, the image processing model processes the sensor data. Processing can, for example, include one or more of pre-processing, feature extraction, classification, and inference as described in more detail above. At step 426, the image processing model extracts at least one subcomponent from the images, and at step 428, can optionally determine one or more dimension values associated with the at least one subcomponent. Finally, at step 430, the image processing model generates and outputs a range estimate to the vehicle.

Figure 5:
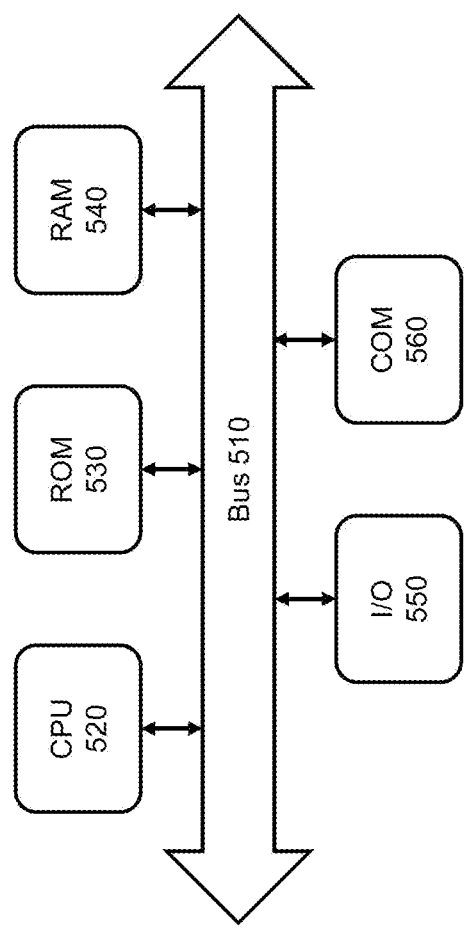
FIG. 5 depicts an example system that may execute methods described below.

FIG. 5 depicts an example system, including a computer, that can execute one or more embodiments of the invention. Specifically, the computer (or "platform" as it may not be a single physical computer infrastructure) can include a data communication interface 560 for packet data communication. The platform can also include a central processing unit ("CPU") 520, in the form of one or more processors, for executing program instructions. The platform can include an internal communication bus 510, and the platform can also include a program storage and/or a data storage for various data files to be processed and/or communicated by the platform such as ROM 530 and RAM 540, although the system 500 can receive programming and data via network communications. The system 500 also can include input and output ports 550 to connect with input and output devices such as keyboards, mice, touchscreens, monitors, displays, etc. Of course, the various system functions can be implemented in a distributed fashion on a number of similar platforms, to distribute the processing load. Alternatively, the systems can be implemented by appropriate programming of one computer hardware platform.

The general discussion of this disclosure provides a brief, general description of a suitable computing environment in which the present disclosure can be implemented. In some cases, any of the disclosed systems, methods, and/or graphical user interfaces can be executed by or implemented by a computing system consistent with or similar to that depicted and/or explained in this disclosure. Although not required, aspects of the present disclosure are described in the context of computer-executable instructions, such as routines executed by a data processing device, e.g., a server computer. Those skilled in the relevant art will appreciate that aspects of the present disclosure can be practiced with other communications, data processing, or computer system configurations.

Aspects of the present disclosure can be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure can also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices can be implemented in a single device. In a distributed computing environment, program modules can be located in both local and/or remote memory storage devices.

Aspects of the present disclosure are stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure are distributed over the Internet and/or over other networks, including wireless networks, on a propagated signal on a propagation medium (e.g., an electromagnetic wave(s), a sound wave, etc.) over a period of time, and/or they can be provided on any analog or digital network (i.e., packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which can provide non-transitory storage at any time for the software programming. All or portions of the software can at times be communicated through the Internet or various other telecommunication networks. Such communications, for example, can enable loading of the software from one computer or processor into another, for example, from a management server or host computer of the mobile communication network into the computer platform of a server and/or from a server to the mobile device. Thus, another type of media that can bear the software elements includes optical, electrical, and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for range estimation in an autonomous maritime vehicle, comprising:
    a vehicle, comprising:
        a processing unit comprising one or more processors; and
        one or more sensors; and
    wherein the system is configured to:
        receive, from the one or more sensors, sensor data comprising one or more images of a maritime environment, wherein the one or more images comprise at least one maritime object and one or more sub-components associated with the at least one maritime object;
        process, using an image processing model, the sensor data, wherein the image processing model is trained to generate a range estimation of the vehicle from the maritime object based on a set of sample images, wherein a first subset of the set of sample images comprises a plurality of synthetic images generated by a simulation engine, and wherein a second subset of the set of sample images comprises a plurality of real-world images captured by an identification system in a maritime environment;
        extract, using the image processing model, at least one sub-component from the one or more sub-components associated with the maritime object; and
        generate, using the image processing model, a range estimate of the vehicle from the maritime object based on the extracted at least one sub-component.

2. The system of claim 1, wherein the identification system comprises an observation device, and the plurality of real-world images are captured by the observation device.

3. The system of claim 2, wherein the identification system communicates the real-world images and location information to a database, wherein each of the real-world images comprises at least one real-world object, and wherein the location information includes the location of the real-world object and the location of the observation device.

4. The system of claim 3, wherein one or more of the real-world images are labeled with known range data, and wherein the known range data is based on a distance between the location of the observation device and the location of the real-world object.

5. The system of claim 4, wherein the system is further configured to:
    estimate, using the image processing model, the range between the observation device and the real-world object;
    compare, using the image processing model, the estimated range with the known range data; and
    update, using the image processing model, a neural network associated with the image processing model based on the comparison.

6. The system of claim 5, wherein the estimated range between the observation device and the real-world object is based on information learned by the image processing model about one or more sub-components of the real-world object.

7. The system of claim 1, wherein the plurality of synthetic images are generated by the simulation engine executing simulations in one or more virtual maritime environments, wherein each virtual maritime environment comprises at least one virtual object and one or more sub-components associated with the at least one virtual object.

8. The system of claim 7, wherein the simulations comprise a virtual camera with a known location within the virtual maritime environment, wherein the virtual camera is configured to capture an image of the at least one virtual object having a known location within the virtual maritime environment.

9. The system of claim 8, wherein one or more of the synthetic images are labeled with known range data, and wherein the known range data is based on a distance between the location of the virtual camera and the location of the virtual object.

10. The system of claim 9, wherein the system is further configured to:
    estimate, using the image processing model, the range between the virtual camera and the virtual object;
    compare, using the image processing model, the estimated range with the known range data; and
    update, using the image processing model, a neural network associated with the image processing model based on the comparison.

11. A method for range estimation in an autonomous maritime vehicle, comprising:
    receiving, from one or more sensors disposed on the vehicle, sensor data comprising one or more images of a maritime environment, wherein the one or more images comprise at least one maritime object and one or more sub-components associated with the at least one maritime object;
    processing, using an image processing model, the sensor data, wherein the image processing model is trained to generate a range estimation of the vehicle from the maritime object based on a set of sample images, wherein a first subset of the set of sample images comprises a plurality of synthetic images generated by a simulation engine, and wherein a second subset of the set of sample images comprises a plurality of real-world images captured by an identification system in a maritime environment;
    extracting, using the image processing model, at least one sub-component from the one or more sub-components associated with the maritime object; and
    generating, using the image processing model, a range estimate of the vehicle from the maritime object based on the extracted at least one sub-component.

12. The method of claim 11, wherein the identification system comprises an observation device, and the plurality of real-world images are captured by the observation device.

13. The method of claim 12, further comprising communicating the real-world images and location information to a database, wherein each of the real-world images comprises at least one real-world object, and wherein the location information includes the location of the real-world object and the location of the observation device.

14. The method of claim 13, wherein one or more of the real-world images are labeled with known range data, and wherein the known range data is based on a distance between the location of the observation device and the location of the real-world object.

15. The method of claim 14, further comprising:
    estimating, using the image processing model, the range between the observation device and the real-world object;

comparing, using the image processing model, the estimated range with the known range data; and updating, using the image processing model, a neural network associated with the image processing model based on the comparison.

16. The method of claim 15, wherein the estimated range between the observation device and the real-world object is based on information learned by the image processing model about one or more sub-components of the real-world object.

17. The method of claim 11, further comprising:

generating, using the simulation engine, the plurality of synthetic images by executing simulations in one or more virtual maritime environments, wherein each virtual maritime environment comprises at least one virtual object and one or more sub-components associated with the at least one virtual object.

18. The method of claim 17, wherein the simulations comprise a virtual camera with a known location within the virtual maritime environment, wherein the virtual camera is configured to capture an image of the at least one virtual object having a known location within the virtual maritime environment.

19. The method of claim 18, wherein one or more of the synthetic images are labeled with known range data, and wherein the known range data is based on a distance between the location of the virtual camera and the location of the virtual object.

20. The method of claim 19, further comprising:

estimating, using the image processing model, the range between the virtual camera and the virtual object;

comparing, using the image processing model, the estimated range with the known range data; and updating, using the image processing model, a neural network associated with the image processing model based on the comparison.

* * * * *